United States Patent
Klinkenberger (10) Patent No.: US 7,475,905 B2
(45) Date of Patent: Jan. 13, 2009

(54) AIRBAG MODULE

(75) Inventor: Amy L. Klinkenberger, Highland, MI (US)

(73) Assignee: TK Holdings Inc., Auburn Hills, MI (US)

( * ) Notice: Subject to any disclaimer, the term of this patent is extended or adjusted under 35 U.S.C. 154(b) by 293 days.

(21) Appl. No.: 11/094,258

(22) Filed: Mar. 31, 2005

(65) Prior Publication Data

US 2006/0220364 A1 Oct. 5, 2006

(51) Int. Cl.
*B60R 21/237* (2006.01)
(52) U.S. Cl. .................... 280/743.1; 280/732
(58) Field of Classification Search .............. 280/728.1, 280/729, 730.1, 731, 732, 743.1, 743.2
See application file for complete search history.

(56) References Cited

U.S. PATENT DOCUMENTS

| | | | |
|---|---|---|---|
| 5,044,663 A | | 9/1991 | Seizert |
| 5,253,892 A | * | 10/1993 | Satoh ................. 280/731 |
| 5,531,476 A | * | 7/1996 | Kerner ................. 280/743.1 |
| 5,945,184 A | | 8/1999 | Nagata et al. |
| 6,042,147 A | | 3/2000 | Nishijima et al. |
| 6,536,800 B2 | | 3/2003 | Kumagai et al. |
| 6,676,158 B2 | * | 1/2004 | Ishikawa ................. 280/743.1 |
| 6,802,528 B2 | * | 10/2004 | Short et al. ............. 280/728.3 |
| 2001/0033072 A1 | | 10/2001 | Kumagai et al. |
| 2002/0084638 A1 | * | 7/2002 | Neupert ................. 280/743.1 |
| 2002/0109338 A1 | * | 8/2002 | Luders et al. ............ 280/730.1 |
| 2002/0117838 A1 | * | 8/2002 | Burdock ................. 280/743.1 |
| 2002/0195800 A1 | * | 12/2002 | Florsheimer ............ 280/728.3 |
| 2003/0173762 A1 | | 9/2003 | Kamagai et al. |
| 2003/0189320 A1 | | 10/2003 | Short et al. |
| 2003/0230883 A1 | | 12/2003 | Heym |
| 2004/0145160 A1 | | 7/2004 | Hasebe et al. |
| 2004/0145161 A1 | | 7/2004 | Hasebe et al. |
| 2004/0155439 A1 | | 8/2004 | Hasebe et al. |
| 2004/0155440 A1 | | 8/2004 | Hasebe et al. |
| 2004/0160041 A1 | | 8/2004 | Hasebe et al. |
| 2004/0160048 A1 | | 8/2004 | Hasebe et al. |
| 2004/0164526 A1 | | 8/2004 | Hasebe et al. |

FOREIGN PATENT DOCUMENTS

EP 1 043 196 A2 * 10/2000

\* cited by examiner

*Primary Examiner*—Ruth Ilan
(74) *Attorney, Agent, or Firm*—Foley & Lardner LLP (57) ABSTRACT

An airbag system for a vehicle including an airbag, an inflator and a cover a cover positioned between the airbag and the vehicle interior. The airbag is folded so that at least two portions of the airbag are positioned adjacent the inflator. The two portions of the airbag include only a single layer of material so that the two portions of the airbag deploy outside the cover before a remaining portion of the airbag.

14 Claims, 8 Drawing Sheets

AIRBAG MODULE

BACKGROUND

The present invention relates generally to systems and devices for protecting vehicle occupants from injury. More specifically, the present invention relates to airbag devices.

An airbag device installed in an automobile includes an airbag, a gas generator commonly called an inflator, and a module cover for covering and retaining the airbag. In an emergency of the automobile, such as when the automobile collides, the gas generator operates, causing the airbag to expand and to catch an occupant in the automobile.

The airbag may be a driver-side airbag, a passenger-side airbag, a rear-side airbag, and a side-protection airbag. Among various airbag devices, a whole structure of the passenger-side airbag device is stored in an instrument panel at a front of a vehicle cabin.

The airbag module generally includes a retainer for retaining the airbag. The retainer is typically connected to the vehicle structure. The airbag module typically includes a cover overlying the airbag and retainer and the outer surface of the module cover faces into the vehicle passenger compartment. For a driver airbag device, the airbag module is mounted to a steering wheel of a vehicle. For a passenger airbag device, the airbag module is mounted to an instrument panel of the vehicle. In the event of a vehicle emergency such as a collision, an inflator in the airbag module delivers inflation gas into the airbag thereby inflating the airbag. As the airbag inflates, the airbag exerts pressure on the module cover. When sufficient pressure is exerted on the module cover, the cover ruptures and opens toward the inside of the vehicle cabin thereby allowing the airbag to be inflated inside the vehicle cabin to protect a vehicle occupant.

The airbag is deployed out of the steering wheel or dash and toward an occupant. However, for certain conventional airbags, individuals positioned out of position ("OOP") are in danger of impacting the airbag at a relatively high force. An OOP situation can be, for example, when an occupant's chest is adjacent to the dash panel. In this position, three or six year old dummies received chest impact pressures exceeding Federal standards. In addition, such conventional airbags can cause neck injuries to individuals in such an OOP situation.

Thus, there remains a need to protect an occupant in an OOP situation. In particular, there remains a need to protect an occupant's neck and chest in an OOP situation during a collision.

SUMMARY

According to an embodiment of the present invention, an airbag system for a vehicle is provided. The airbag system comprises an airbag cushion, an inflator for inflating the airbag cushion, a module for holding the airbag cushion, and a cover positioned between the uninflated airbag cushion and the vehicle interior. The airbag cushion is folded such that a single layer of material area is positioned over a central portion of the inflator.

According to an embodiment of the present invention, an airbag system for a vehicle is provided. The airbag system comprises an airbag cushion with a first portion and a second portion; an inflator for inflating the airbag cushion; a module for holding the airbag cushion; and a cover positioned between the uninflated airbag and the vehicle interior. The airbag cushion is configured to deploy initially laterally left and right of an opening of the cover.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 8(a) and 8(b) are views of an airbag in the upper portion of a dashboard in deployment.

FIGS. 9(a) and 9(b) are views of an airbag in the lower portion of a dashboard in deployment.

DETAILED DESCRIPTION

Hereinafter, embodiments of the present invention will be described with reference to the attached drawings.

FIGS. 1-4 show an embodiment of an airbag module 100. The airbag module 100 includes an airbag cushion 10, an inflator 20, a retainer 30, and a module cover 40.

Figure 1:
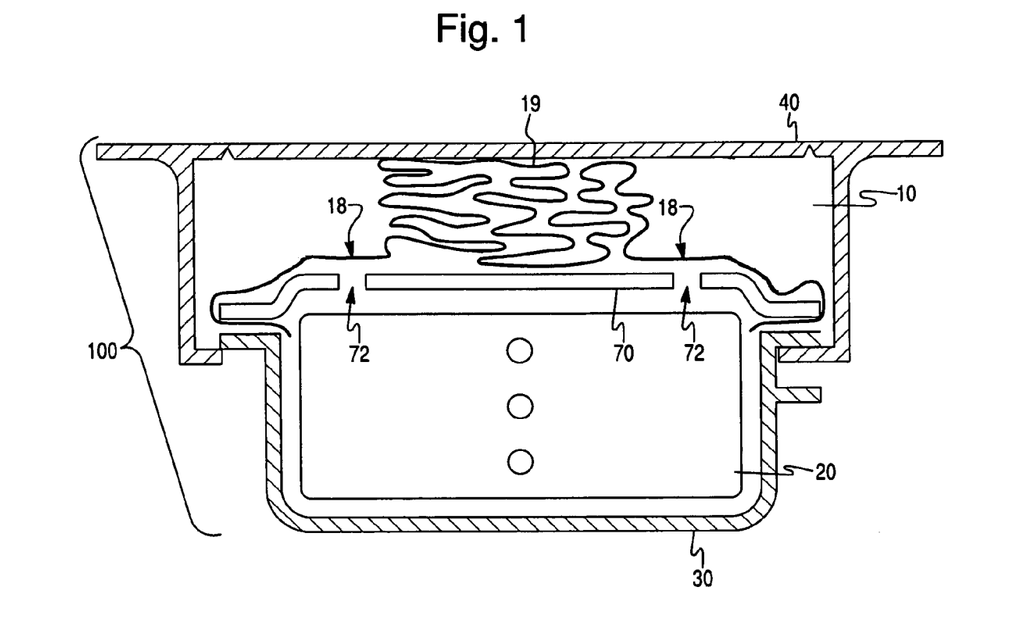
FIG. 1 is a sectional view of an airbag module according to an embodiment.

The airbag module 100 may be mounted in the front dashboard panel or other suitable location in the vehicle. The airbag module 100 is positioned within the dashboard panel of the vehicle in order to protect an occupant in a collision, specifically a frontal collision. However, the airbag module may be mounted along the side, in a door, in a steering wheel, or any other suitable location for protecting a passenger or driver of a vehicle.

The inflator 20 provides the inflation gas to inflate and deploy the airbag cushion 10 during a collision. The inflator 20 may comprise a gas generant or propellant in order to provide inflation gas to the airbag cushion 10. In addition, the inflator 20 may include a decomposing type material as the source of the pressurized gas for the airbag cushion 10. The inflator 20 may include an igniter or initiator assembly (not shown). The igniter receives a signal from a controller in order to initiate operation of the inflator 20 when the controller determines a collision is occurring.

The airbag module 100 is mounted to the vehicle by the retainer 30. The retainer holds the uninflated airbag cushion 10.

Cover 40 is attached to the retainer 30 such that an open area is created between the cover 40 and the retainer 30. The cover 40 forms the barrier between the airbag cushion 10 and the inside of the vehicle passenger cabin area. For example, the cover 40 may form the panel along the front dashboard in a vehicle.

The cover 40 is generally formed of a plastic material. The cover 40 must be able to withstand any wear and tear derived from its position in the cabin of a vehicle and must also be able to break open upon deployment of the airbag cushion 10.

Figure 12:
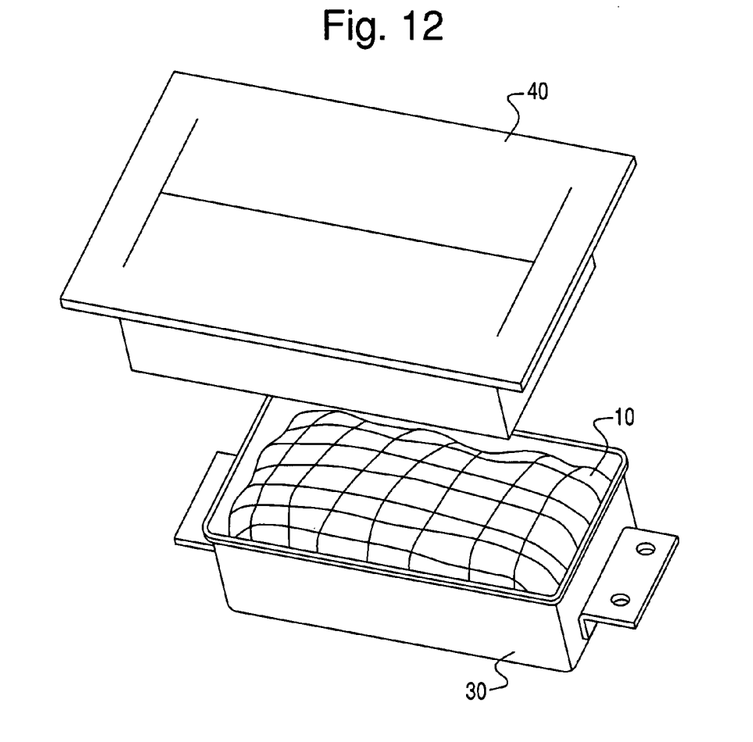
FIG. 12 is a view of an airbag module with the cover and airbag shown.
Figure 13:
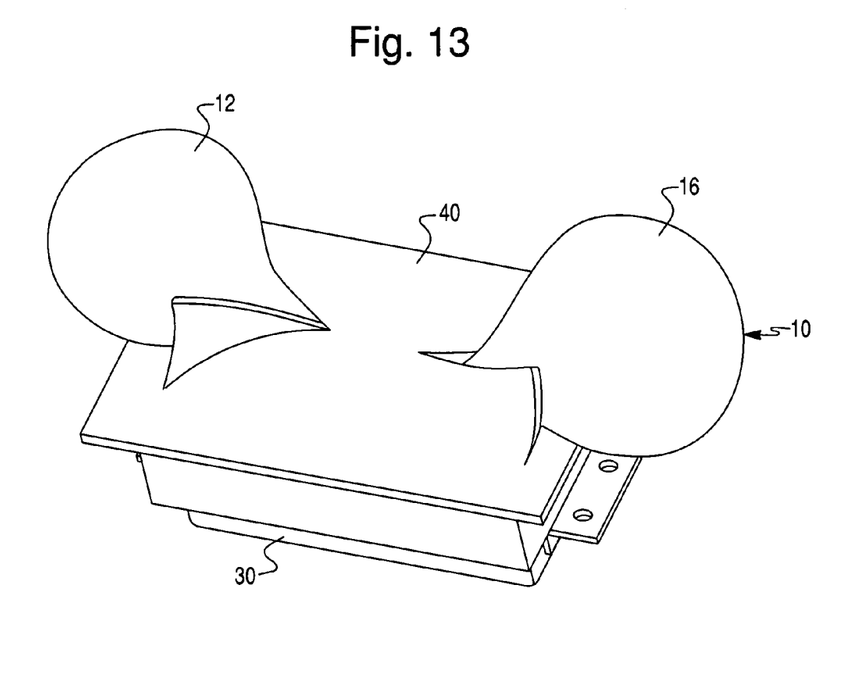
FIG. 13 is another view of the airbag module with the cushion of FIG. 3 during deployment.

The cover 40 may include a notch or tear seam, such as shown in FIGS. 12 and 13. The notch is a weakened area that allows the cover 40 to break open upon deployment of the airbag cushion 10. The airbag cushion 10, as it is being filled with inflation gas, pushes with a force against the inside of the cover 40. The notch or weakened area allows the cover 40 to break open at an appropriate location and at an appropriate time during deployment of the airbag cushion 10.

Figure 3:
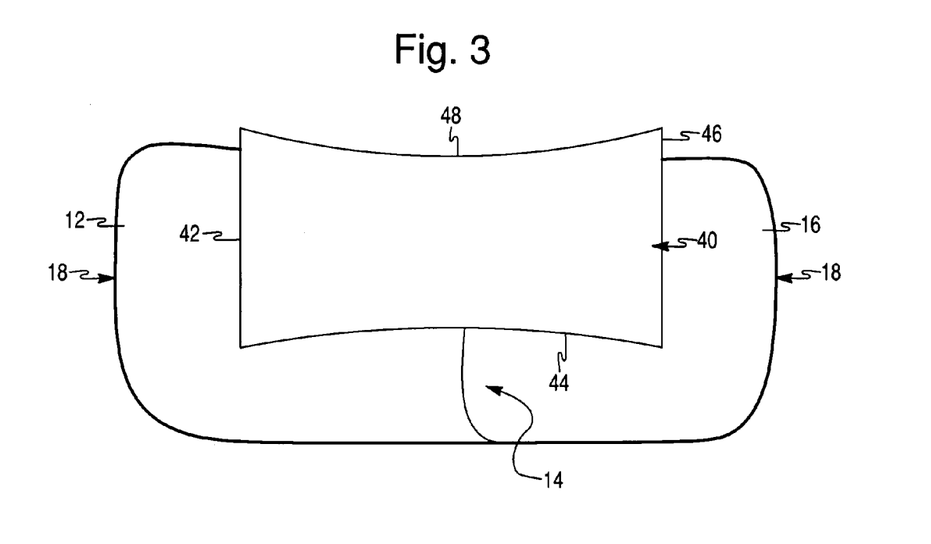
FIG. 3 is a front view of the cushion upon initial inflation, according to FIG. 1.

The cover 40, according to an embodiment, is configured to break open along three sides, forming a rectangular shape. The cover 40 is configured to open along a first side 42, second side 46 and a lower side 44, as shown in FIG. 3. The first, second and lower sides 42, 46, 44 may open concurrently, or in delayed intervals. As the first, second, and lower sides 42, 46, 44 open, the cover 40 remains attached to the vehicle along an upper connecting side 48. As the cushion 10 deploys, the cushion 10 extends into the vehicle cabin area adjacent the first and second sides 42, 46, and then as the airbag cushion 10 later deploys, the cushion 10 expands adjacent the lower side 44. Upon final deployment, the cover 40 is capable of flipping up and backwards to allow the cushion 10 to fully inflate and protect an occupant.

The cover 40 at the connection side 48 may be hingedly connected, connected by a crease, or any other suitable mechanism. It should be recognized by one skilled in the art that the connecting side 48 may be located on any side of the cover (first, second, upper, lower, etc.). Furthermore, the cover 40 is not limited to a rectangular shape. The cover 40 may comprise any shape, with any suitable number of sides, such as a circle, oval, triangle, etc.

According to another embodiment, the cover 40 may not remain connected to the vehicle upon inflation of the cushion 10. Rather, the cover 40 may disconnect from the vehicle as the cushion 10 deploys. Further, the cover 40 can break open in any appropriate configuration, such as along one or two sides.

Figure 2:
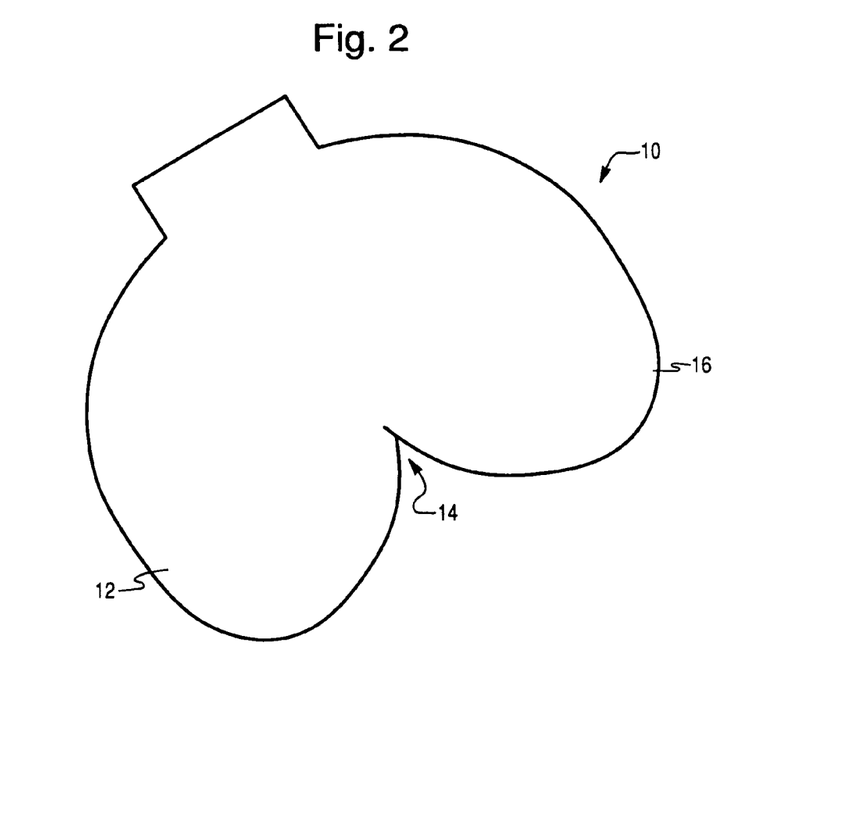
FIG. 2 is a perspective view of a filled cushion according to FIG. 1.

The airbag cushion 10 includes two gas bag sections, a first section 12 and a second section 16, which are formed of a single airbag. The sections 12, 16 are configured to deploy away from each other, such as shown in FIGS. 2 and 3. The first section 12 creates a first lobe which deploys out of a first side 42 of the cover 40. The second section 16 creates a second lobe which deploys out of a second side 46 of the cover 40. As the first and second sections 12, 16 deploy, they deploy laterally left and right of the cover 40 opening. This lateral deployment causes the airbag cushion 10 to initially contact the occupant 50 towards the sides of the chest and shoulders, rather than directly in the center of the chest and face. This initial contact distributes the total force imposed on the occupant 50 over a larger area and at a lower force level per unit of area.

The airbag cushion 10 may be formed of a fabric, such as a nylon or polyester weave. However, the airbag cushion 10 may be comprised of any suitable material.

According to an embodiment, the cushion 10 with the first and second sections 12, 16 can be formed by a twin fold utilizing a random fold such as a crunch fold, as shown in FIG. 1. The crunch fold is a random fold that the cushion 10 is folded essentially randomly on a small scale. On a larger scale, the cushion 10 can be folded with areas of generally fine, medium or relatively course crunch folds. Upon deployment, the crunched cushion 10 simply expands from its crunched state into an expanded state. The cushion 10, according to this embodiment, may be crunched randomly into the module 10, but formed such that the two sections 12, 16 will deploy laterally left and right of the module cover 40 opening.

Figure 7:
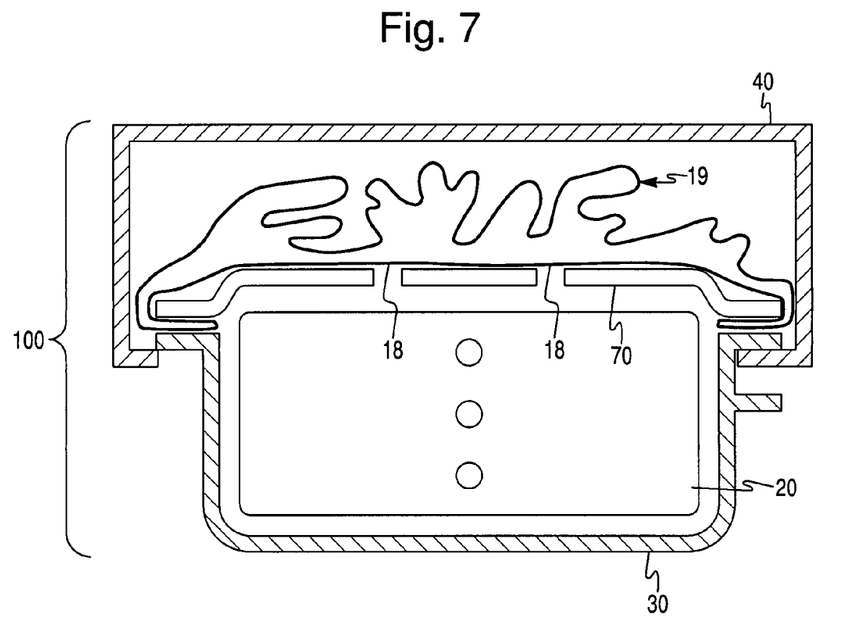
FIG. 7 is a sectional view of an airbag module according to another embodiment.

According to another embodiment, the cushion 10 with the first and second sections 12, 16 may be formed by folding the cushion 10 in an appropriate geometric pattern. Such methods are commonly known in the art. The geometric pattern should, according to an embodiment, minimize the bulk of the cushion 10, such that the space required in the airbag module 10 between the cover 40 and the retainer 30 is relatively small. For example, one possible fold is shown in FIG. 7.

According to another embodiment, the cushion 10 may be folded and/or packed into the module 100 such that a single layer 18 of material is directly over the center of the deployment area, as shown in FIG. 1. The single layer of material area 18 may be comprised of, for example, a single layer of airbag material, as opposed to an area containing the numerous folds or crunched portion of the cushion 10. As shown in FIG. 1, the single layer of material section 18, according to an embodiment of the present invention, is the only portion of the airbag 10 positioned over the exit port 72 for the inflator 20. One possible advantage is that the airbag module 100 requires relatively less pressure and therefore less time to accelerate the single layer of material, as opposed to the multiple layers packed above the inflator 20, as shown in FIG. 7. In this embodiment, the aim or initial movement of the cushion 10 is determined by the location of the single layer area 18 in relation to the remaining portion of the airbag; the thickly packed and randomly folded areas 19. The airbag 10 can include multiple single layer area 18, such as shown in FIG. 1. For example, the single layer area 18 may be positioned at either end of the inflator 20 in order to project the first section 12 and second section 16 laterally left and right.

Figure 4:
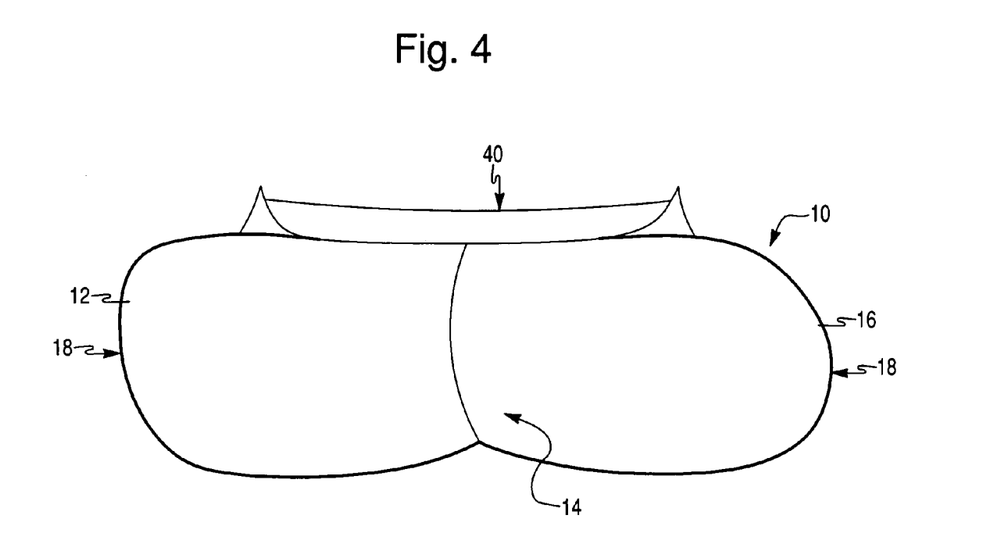
FIG. 4 is a front view of the cushion, according to FIG. 1.

The positioning of the single layer of material areas 18 can direct the deployment of the of lobes 12, 16 the airbag 10. As shown in FIGS. 3 and 4, the lobes 12, 16 deploy laterally left and right due to the location of the single layer of material areas 18 over the inflator 20.

According to another embodiment, the first section 12 and the second section 16 are formed by two separate and distinct airbags to form the airbag cushion 10. The first section 12 comprises a first airbag and the second section 16 comprises a second airbag. The first and second sections airbags 12, 16 may be connected at the inflator 20. The first and second sections 12, 16 are positioned within the airbag module 100 so that upon deployment, the sections 12, 16 deploy laterally left and right.

Figure 5:
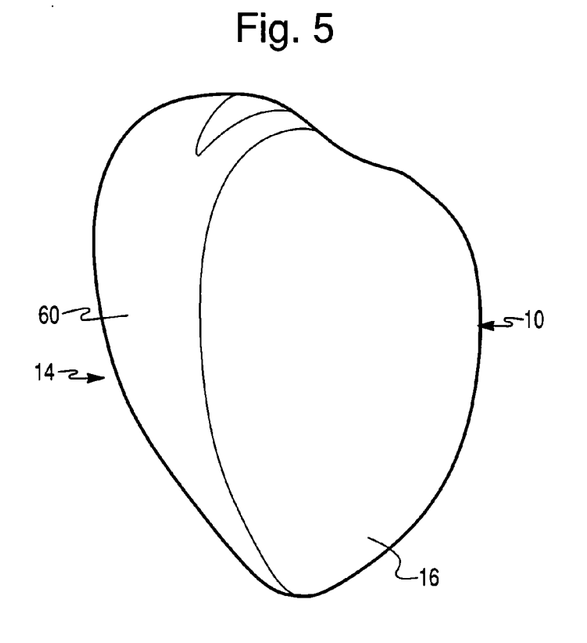
FIG. 5 is a side view of the cushion fully inflated.
Figure 6:
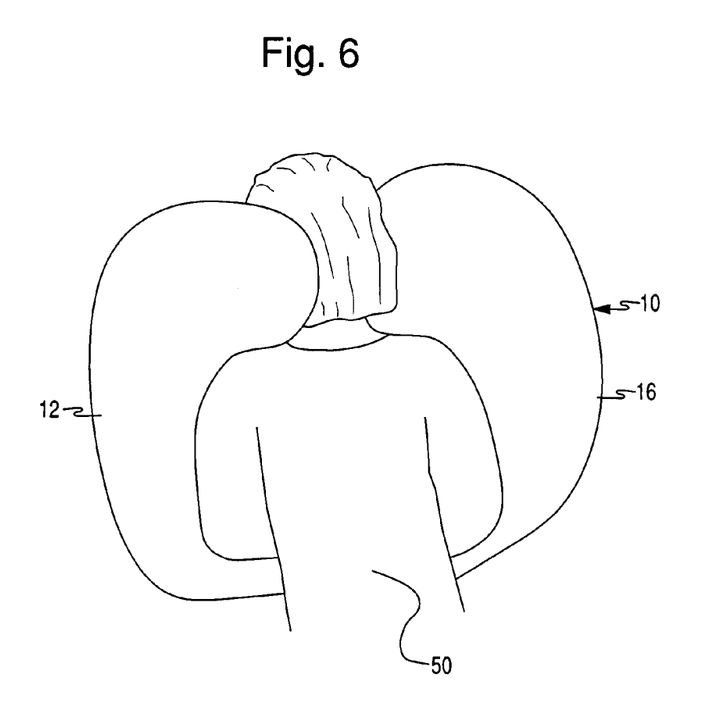
FIG. 6 is a view of an occupant impacting the cushion.

According to another embodiment, the airbag module 100 may also include a sheet or sheet-like element 60, shown in FIG. 5. The sheet 60 spans the area 14 between the first airbag portion 12 and the second airbag portion 16 so that, in the case of an impact directed toward the front side of the gas bag, the occupant 50 to be protected is intercepted by the sheet or sheet-like element 60. The sheet 60 may connect the airbag sections 12, 16 that are a single airbag, or the sheet 60 may connect the airbag sections 12, 16 which are formed of separate, distinct airbags.

As a result, a body part of the occupant 50 may penetrate into the area 14 for a certain distance; but the occupant 50 is not permitted to completely penetrate into the area 14 past the sheet or sheet-like element 60. The airbag cushion 10 and sheet or sheet-like element 60 provides for the restraining action for protecting a vehicle occupant 50 to be essentially taken on by the sheet or sheet-like element 60 and, as a result, the two inflatable gas bag sections 12, 16 are used essentially only for the purpose of tightening the sheet or sheet-like element 60. As a result, the restraining action required for protecting the vehicle occupant 50 is achieved with the occupant 50 coming into contact with the covering 60 of the airbag cushion 10 and not with portions of the airbag cushion 10 which are possibly hot.

According to an embodiment, in order to fasten the sheet or sheet-like element 60 may be sewn to the airbag cushion 10. The seams used may be those that are also used for connecting different parts of the airbag sections 12, 16. According to another embodiment, any other suitable mechanism for connecting the sheet 60 to the cushion 10 may be used, such as, for example, tethers, fasteners, adhesives, etc.

The airbag module 100 may also include a diffuser 70, shown in FIG. 1. The diffuser 70 is configured to disperse the inflation gases from the inflator 20 and into the airbag cushion 10. Dispersing the gas allows the gas to expand and cool. The diffuser 70 may also include a surface which further allows the gas to transfer some of its heat. The diffuser 70 may be used to direct the gas by forcing the gas through specific exit ports or holes 72. Gas may be directed to cause the airbag cushion 10 to inflate in a particular manner, such as, for example, laterally left and right of the cover 40 opening. Once the gas passes through the diffuser 70, the gas is sufficiently cooled and/or not concentrated to prevent burning holes in the airbag cushion 10. Without a diffuser 70, the hot gas is concentrated on the airbag cushion 10. The concentrated hot gas and the confined space may combine to cause the gas to burn one or more holes in the airbag cushion 10 material. The holes cause the airbag cushion 10 to inflate improperly. The single layer areas 18 of the airbag 10 can be placed over the openings in the diffuser to deploy those areas 18 first.

According to another embodiment of the present invention, the remaining randomly folded portions 19 of the airbag 10 can fall over on top of the single layer areas 18 in the folded airbag 10, as can be seen in FIG. 7. In this configuration, the single layer areas 18 will still deploy first, thus determining the shape and location of the deploying airbag.

Figure 8A:
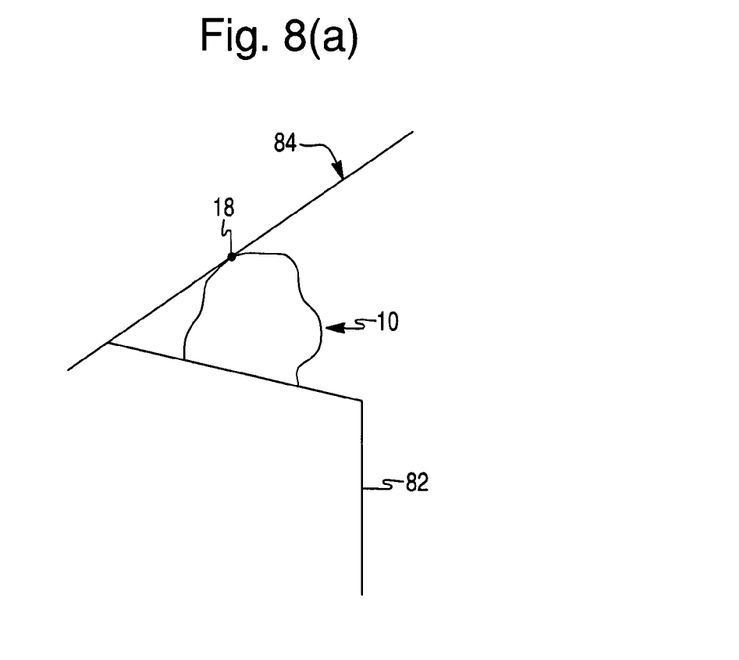
FIG. 8(a) shows the initial path of the deploying airbag and FIG. 8(b) shows the airbag fully deployed.
Figure 8B:
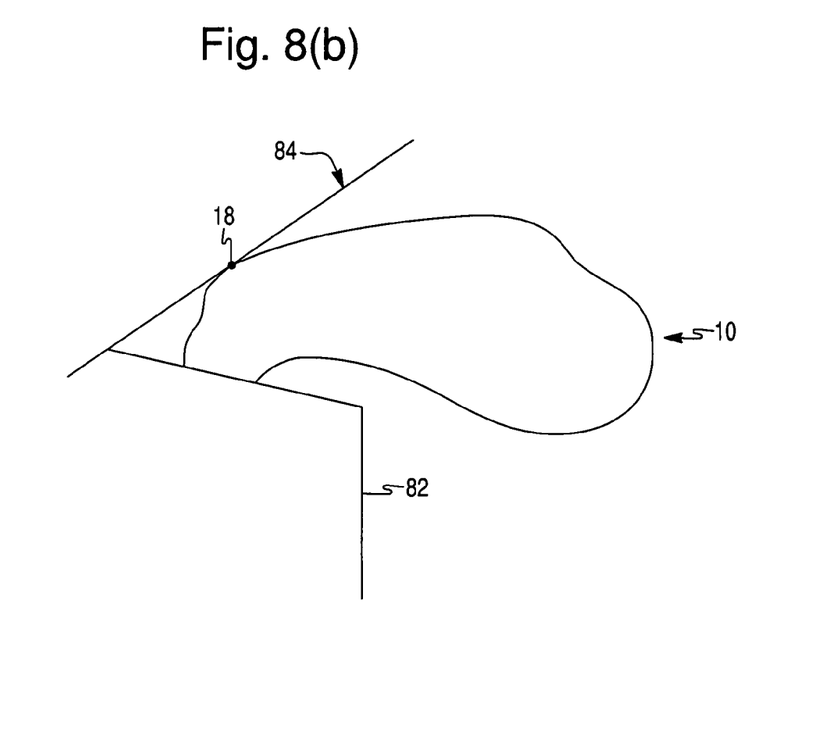
Figure 9A:
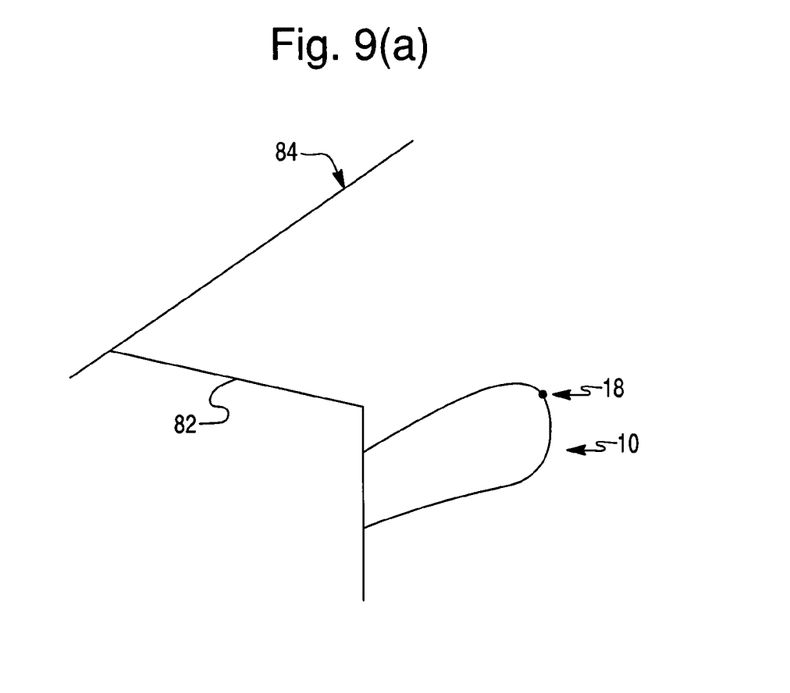
FIG. 9(a) shows the initial path of the deploying airbag and FIG. 9(b) shows the airbag fully deployed.
Figure 9B:
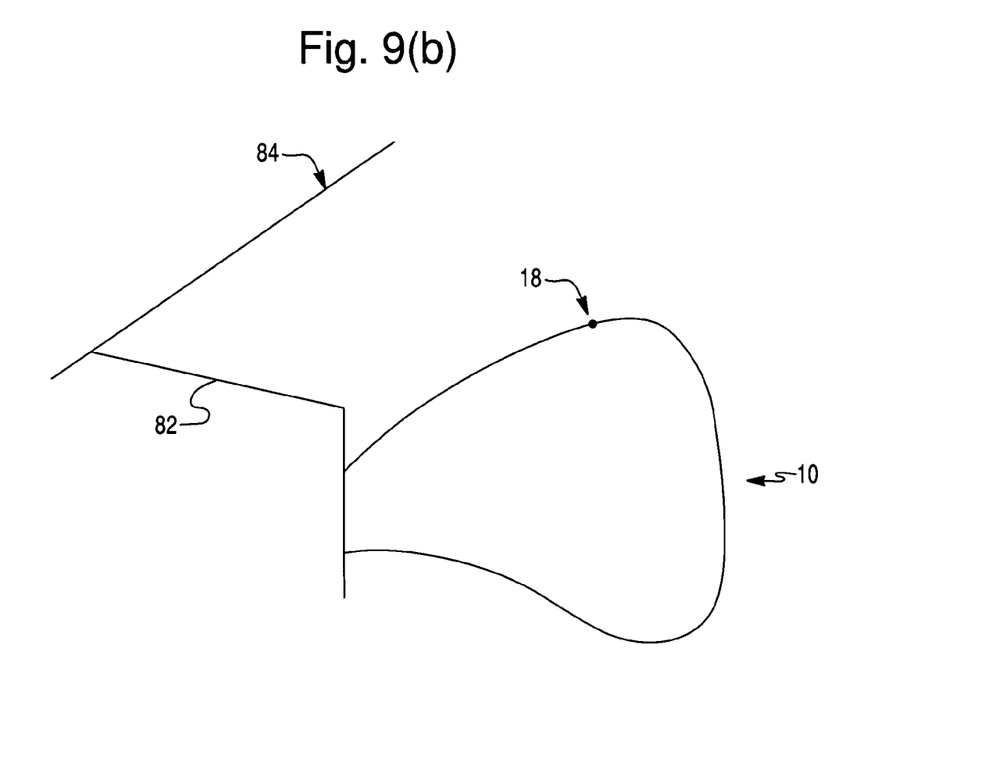
Figure 10:
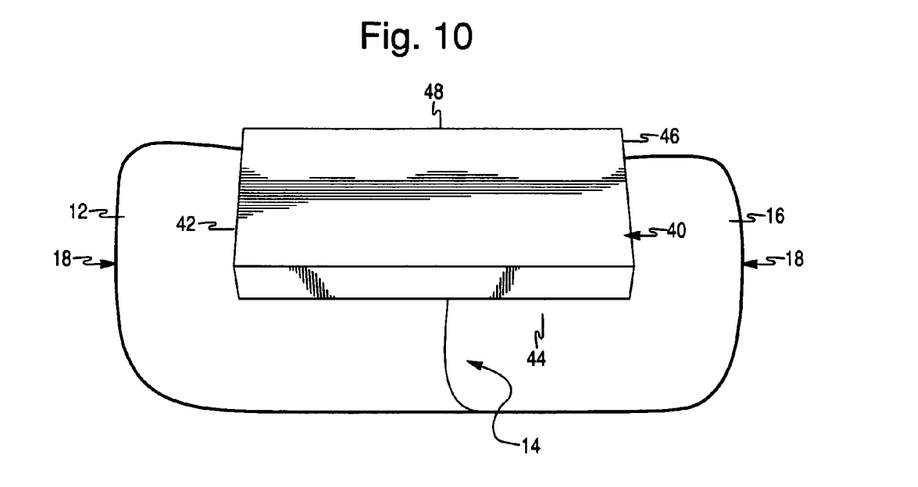
FIG. 10 is an alternative front view of the cushion of FIG. 3 upon initial inflation.
Figure 11:
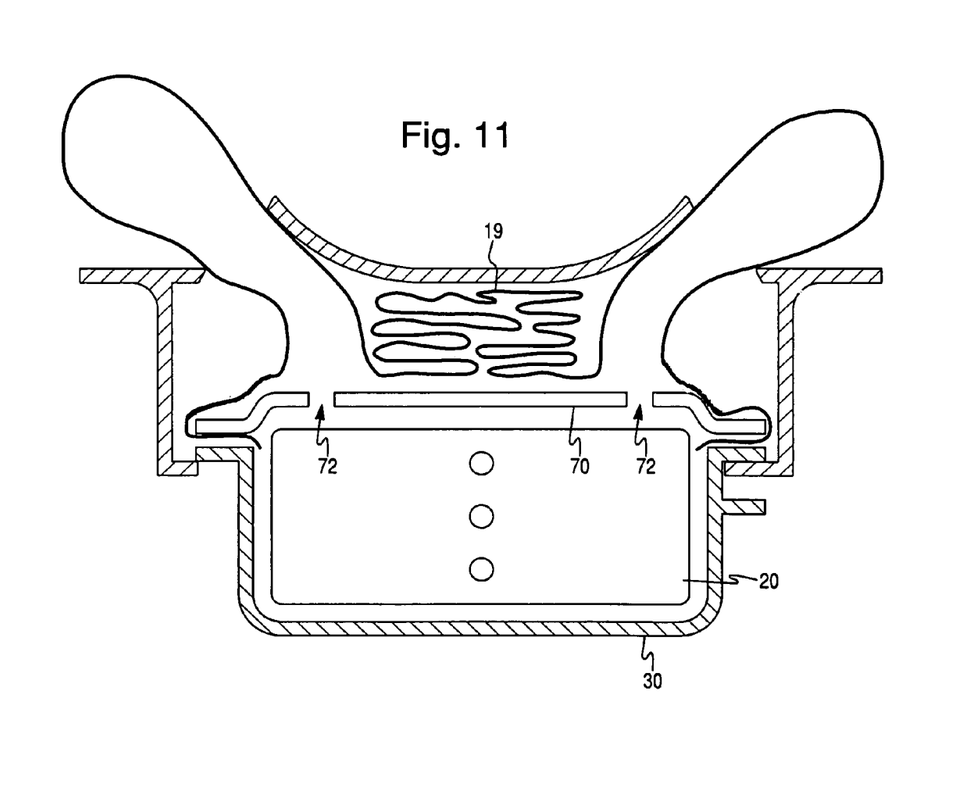
FIG. 11 is another view of the cushion of FIG. 3 during inflation.

The position of the single layer material area 18 over the inflator 20 determines the location of the initially deployed airbag 10. Thus, the configuration of the airbag 10 as it initially deploys can be determined or targeted by the positioning of a single layer area 18 over the inflator 20. For example, FIGS. 8(*a*) and 8(*b*) show a side view an airbag 10 positioned in the top portion of a dashboard 82, near a windshield 84. In this embodiment, the single layer area 18 of the airbag 10 is positioned over deployment area of the inflator 20. Thus, in the initial deployment of the airbag 10, as shown in FIG. 8(*a*), the single layer area 18 deploys up towards the windshield 84. When the airbag 10 fully deploys, the airbag 10 extends closer to the occupant, with the single layer area 18 still near the windshield, in the upper portion of the airbag 10.

While the invention is described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention. Furthermore, any combination of embodiments may be used. All references and publications cited herein are incorporated by reference in their entireties.

What is claimed is:

1. An airbag system for a vehicle, comprising:
   an airbag;
   an inflator for providing inflation gas to the airbag;
   a retainer for housing the airbag;
   a cover positioned between the airbag and the vehicle interior, wherein an open area is formed between the cover and the retainer,
   wherein the airbag is folded into a package, wherein the package includes a first portion and a second portion such that at least the first portion of the airbag is positioned adjacent a first lateral end of the inflator, the second portion of the airbag is positioned adjacent a second lateral end of the inflator, and a remaining portion of the airbag is folded and positioned adjacent a central portion of the inflator,
   wherein the first and second portions of the airbag each include only a single layer of material positioned adjacent to the inflator to receive the inflation gas so that the first and second portions of the airbag deploy outside the cover before the remaining portion of the airbag,
   wherein the remaining portion of the airbag is randomly folded in the open area between the cover and the retainer.

2. The airbag system according to claim 1, further comprising a diffuser covering the inflator, and wherein the first and second portions of the airbag are positioned adjacent the diffuser.

3. The airbag system according to claim 1, wherein first and second portions of the airbag are positioned so that the airbag deploys generally laterally on sides of a vehicle occupant before deploying toward the vehicle occupant.

4. The airbag system according to claim 2, wherein each of the first and second portions of the airbag are positioned adjacent to an opening in the diffuser.

5. An airbag system for a vehicle, comprising:
   an airbag;
   an inflator for providing inflation gas to the airbag;
   a retainer for housing the airbag;
   a cover positioned between the airbag and the vehicle interior, wherein an open area is formed between the cover and the retainer,
   wherein the airbag is folded into a package, wherein the package includes a first portion and a second portion such that at least the first portion of the airbag is positioned adjacent a first lateral end of the inflator, the second portion of the airbag is positioned adjacent a second lateral end of the inflator, and a remaining portion of the airbag is folded and positioned adjacent a central portion of the inflator,
   wherein the first and second portions of the airbag each include only a single layer of material positioned adjacent to the inflator to receive the inflation gas so that the first and second portions of the airbag deploy outside the cover before the remaining portion of the airbag,
   wherein the airbag is configured to include two lobes in an inflated condition.

6. The airbag system according to claim 5, wherein each of the first and second portions of the airbag are located on one of the two lobes of the airbag.

7. The airbag system according to claim 6, wherein the airbag is configured so that each of the two lobes deploy generally laterally on sides of a vehicle occupant before deploying toward the vehicle occupant.

8. An airbag system for a vehicle, comprising:
an airbag including two lobes;
an inflator for providing inflation gas to the airbag; and
a cover positioned between the airbag and the vehicle interior,
wherein the airbag is folded into a package, wherein the package includes a first portion and a second portion so that the first and second portions of the airbag are positioned adjacent the inflator and wherein the first and second portions of the airbag include only a single layer of material positioned adjacent to the inflator to receive the inflation gas so that the two portions of the airbag initially deploy laterally left and right of a vehicle occupant, and wherein a randomly folded portion of the airbag is positioned adjacent a central portion of the inflator between the first and second portions of the airbag.

9. The airbag system according to claim 8, wherein each of the first and second portions of the airbag are located on one of the two lobes.

10. The airbag system according to claim 8, further comprising a diffuser covering the inflator and including a plurality of openings through which inflation gas passes from the inflator into the airbag.

11. The airbag system according to claim 10, wherein the airbag is folded so that each of the two portions overlay one of the diffuser openings.

12. The airbag system according to claim 10, wherein the diffuser includes an opening adjacent the first and second portions of the airbag.

13. The airbag system according to claim 8, wherein the airbag is configured to receive inflation gases from the inflator from a top surface of the inflator in order to deploy the airbag.

14. The airbag system according to claim 13, wherein a portion of the airbag that lays adjacent the top surface of the inflator prior to deployment of the airbag is configured to inflate during deployment.

* * * * *